United States Patent

Senger et al.

Patent Number: 5,871,411
Date of Patent: Feb. 16, 1999

[54] SLIP CONTROLLER FOR A CONTINUOUSLY VARIABLE TRANSMISSION

[75] Inventors: Karl-Heinz Senger, Löchgau; Joachim Luh, Bietigheim-Bissingen; Peter Bäuerle, Ludwigsburg, all of Germany

[73] Assignee: Robert Bosch GmbH, Stuttgart, Germany

[21] Appl. No.: 553,418

[22] PCT Filed: Mar. 29, 1995

[86] PCT No.: PCT/DE95/00425

§ 371 Date: Apr. 8, 1996

§ 102(e) Date: Apr. 8, 1996

[87] PCT Pub. No.: WO95/27159

PCT Pub. Date: Oct. 12, 1995

[30] Foreign Application Priority Data

Apr. 2, 1994 [DE] Germany ............ 44 11 628.4

[51] Int. Cl.⁶ .................................. F16H 59/06
[52] U.S. Cl. ................ 474/11; 474/28; 475/44; 475/45
[58] Field of Search .............. 477/44, 45, 46, 477/37; 474/11, 18, 28, 29, 30, 8

[56] References Cited

U.S. PATENT DOCUMENTS

| | | |
|---|---|---|
| 4,322,798 | 3/1982 | McCoin . |
| 4,665,773 | 5/1987 | Hiramatsu et al. .......... 477/45 X |
| 4,673,378 | 6/1987 | Tokoro et al. .............. 474/18 |
| 4,714,451 | 12/1987 | Yoshida et al. ............. 474/28 |
| 4,731,044 | 3/1988 | Mott ...................... 474/8 |
| 4,734,082 | 3/1988 | Tezuka .................... 477/45 X |
| 5,011,458 | 4/1991 | Kumm ..................... 477/46 X |
| 5,182,968 | 2/1993 | Mott . |
| 5,203,233 | 4/1993 | Hattori et al. ............ 474/18 X |
| 5,211,083 | 5/1993 | Hattori et al. ............ 477/45 X |
| 5,310,384 | 5/1994 | Siemon . |
| 5,556,346 | 9/1996 | Genzel et al. ............. 474/28 |

FOREIGN PATENT DOCUMENTS

| | | |
|---|---|---|
| 0451887 | 10/1991 | European Pat. Off. . |
| 4312745 | 10/1994 | Germany . |
| WO 90/05866 | 5/1990 | WIPO . |
| WO 92/18791 | 10/1992 | WIPO . |

*Primary Examiner*—Khoi Q. Ta
*Assistant Examiner*—Peter T. Kwon
*Attorney, Agent, or Firm*—Walter Ottesen

[57] ABSTRACT

For an electro-hydraulically actuable continuously variable belt transmission, the selected contact pressure at the movable conical pulley discs must be of such a magnitude that the chain, the force transmitting belt or the like does not slip. On the other hand, the contact pressure should not be too great for a high efficiency of the transmission to be achieved at every operating point. The invention reliably prevents slippage of the belt (chain, force transmitting belt or the like) by controlling the belt slip. The mean contact pressure is thereby reduced. As a result, there is a decrease in the mechanical and hydraulic losses at the transmission. A variant of the invention includes an embodiment of a rotational-speed sensor which makes it simultaneously possible to measure the axial position of the pulley disc(s). As a result, there is a reduction in the additional complexity required for slip control compared to the belt-tension control.

31 Claims, 7 Drawing Sheets

SLIP CONTROLLER FOR A CONTINUOUSLY VARIABLE TRANSMISSION

FIELD OF THE INVENTION

The invention relates to a device and to a method for controlling a transmission with a continuously variable transmission ratio.

BACKGROUND OF THE INVENTION

Figure 1:
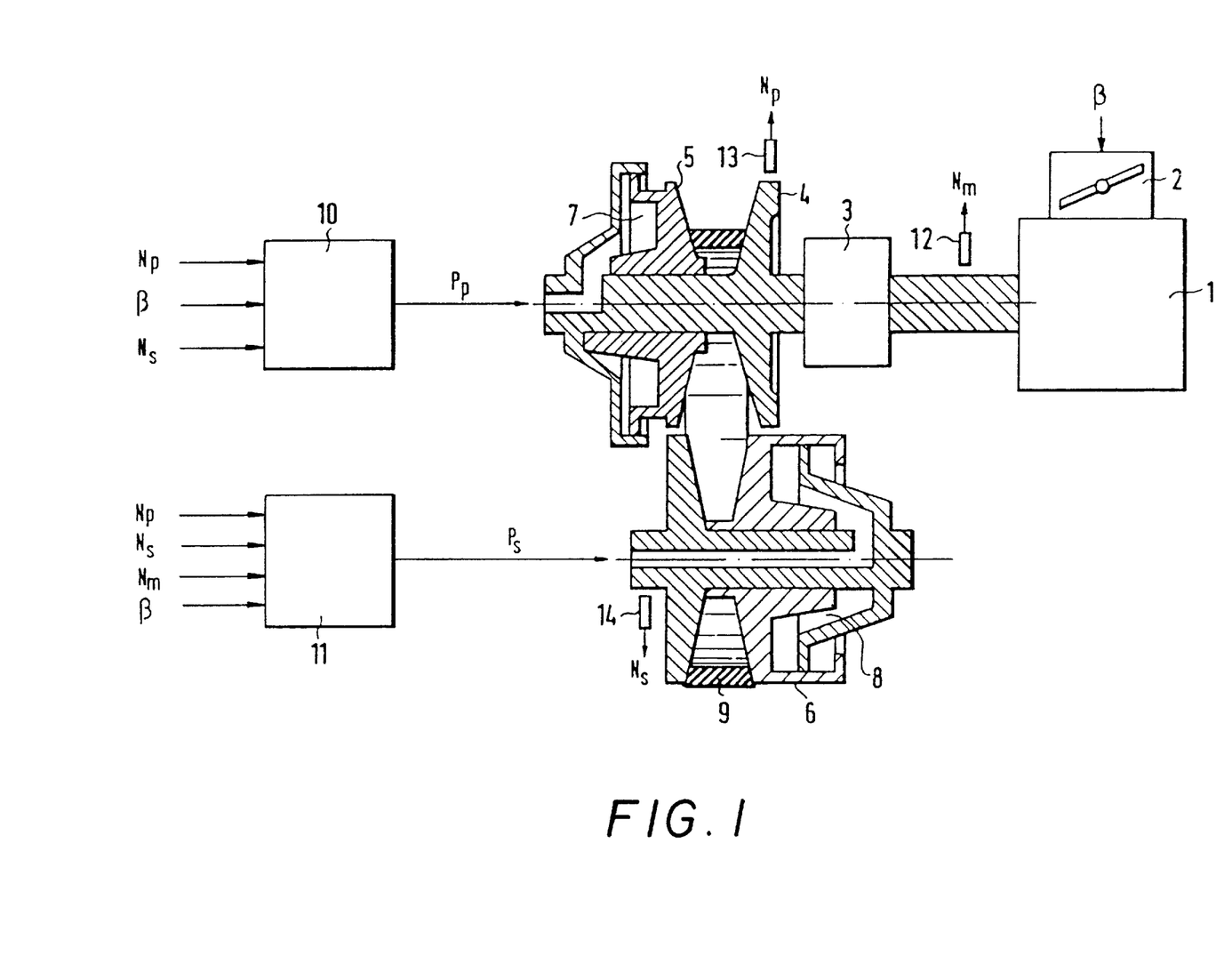

The invention replaces the customary belt-tension control of continuously variable belt transmissions (CVT) with electro-hydraulic actuation. A transmission construction of this kind is shown, in section, in FIG. 1. The engine torque $M_m$ output by the internal combustion engine 1 can be influenced by means of the throttle flap 2. The throttle flap 2 is coupled, for example, mechanically or electrically to the accelerator pedal (not shown). The internal combustion engine 1 is generally coupled to the drive (primary) end of the continuously variable transmission 4 by means of a clutch and/or a converter 3. The output (secondary) end of the continuously variable transmission 4 is connected to the wheels of the vehicle via a transmission (not shown) connected downstream of the transmission 4. On the primary and secondary ends, the continuously variable transmission has respective axially displaceable conical pulley discs 5 and 6. To adjust the transmission ratio, a corresponding primary pressure $P_p$ and a secondary pressure $P_s$ are built up in the respective oil chambers 7 and 8. It must be ensured by a suitable choice of the manipulated variables constituted by the primary pressure $P_p$ and the secondary pressure $P_s$ that:

1. the transmission ratio i corresponds to the desired ratio between primary rotational speed $N_p$ and secondary rotational speed $N_s$; and,
2. the force-transmitting belt 9 (or chain, band) is pressed sufficiently hard against the pulleys to prevent the belt 9 from slipping.

The above-mentioned point 1 is achieved by means of an electrohydraulic transmission ratio control or primary rpm control 10. For point 2, a belt-tension control 11 is provided.

Rotational-speed sensors 12, 13 and 14 are provided on the engine 1 and on the continuously variable transmission 4 for transmission-ratio and belt-tension control and these sensors detect the engine rpm $N_m$, the primary rotational speed $N_p$ and the secondary rotational speed $N_s$.

In the frequently used master-slave system shown in FIG. 1, the secondary pressure $P_s$ is used to set the belt tension and the primary pressure $P_p$ to set the transmission ratio or primary rotational speed. In the alternative partner system, the belt-tension control system influences both the primary and the secondary pressure.

Figure 2:
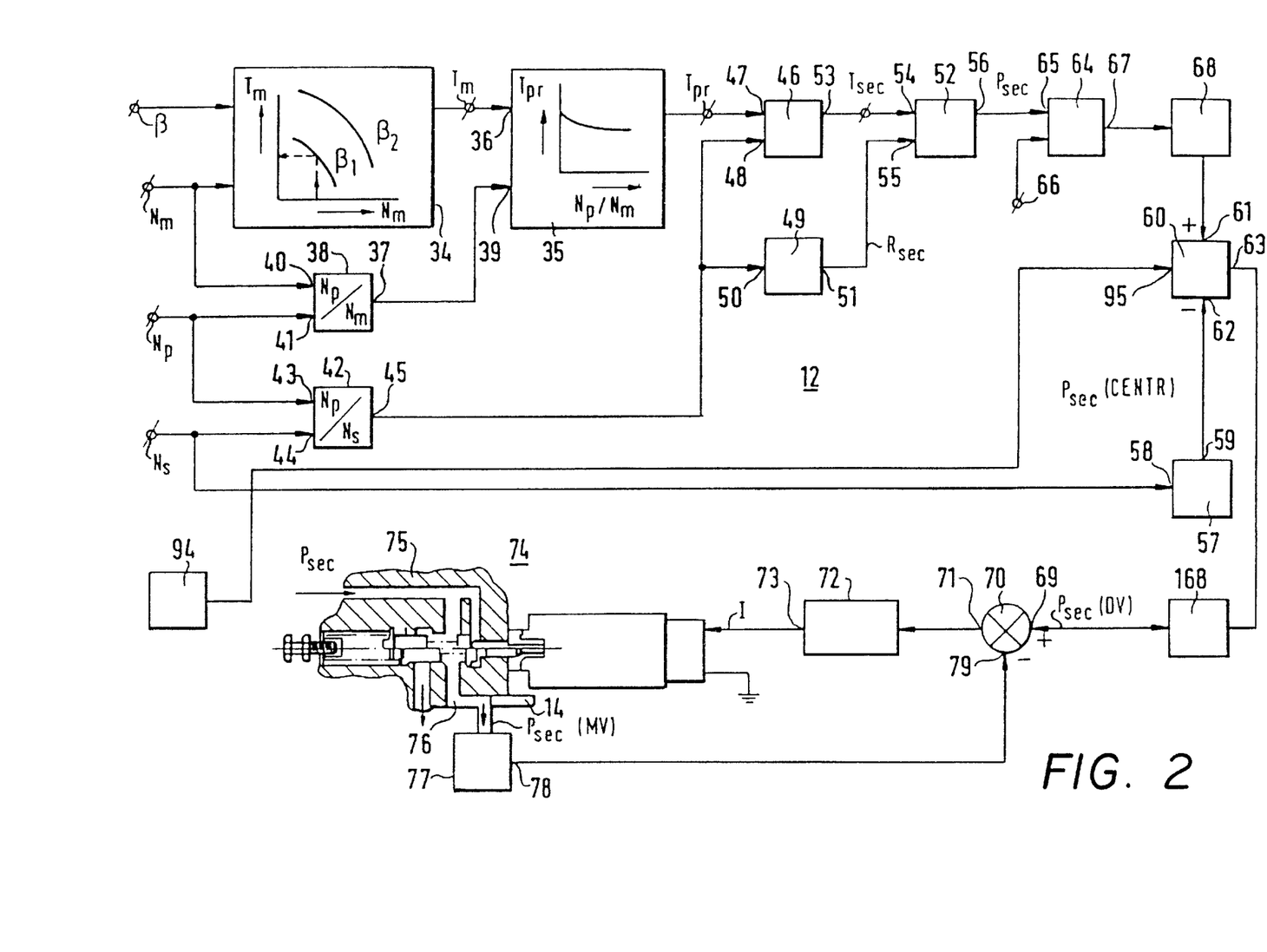

In general, it can be stated that an actuating signal for the belt-tension control is available in the form of a pressure variable $P_B$. A number of methods for controlling the belt tension are known from the literature but these all operate in a similar manner. In the following, EP-A1-0,451,887 is used for the purpose of explanation: for this purpose, FIG. 2 shows the belt-tension control system described in this patent publication. The characteristic field 34 is used to determine the outputted engine torque $T_m$ from the throttle-flap angle β and the engine rpm $N_m$. Blocks 38 and 35 can be used to calculate the primary torque $T_{pr}$ output by the converter. Block 45 calculates the transmission ratio of the continuously variable transmission. By means of block 46, the secondary torque $T_{sec}$ can be estimated from the transmission ratio and the primary torque $T_{pr}$. By means of block 49, the secondary radius $R_{sec}$ is calculated from the transmission ratio. The minimum secondary pressure $P_{sec}$ required is then derived from the secondary radius and the secondary torque $T_{sec}$ by means of block 52. After the addition of a reserve pressure in block 64, the signal is smoothed by means of a low-pass filter 68. The mean pressure $P_{sec}$ (CENTR) generated by centrifugal forces at the secondary pulley is then subtracted from the above pressure by means of block 60. In addition, the result for the pressure 63 is influenced by a sensor signal for the measurement of ground unevenness 94 and is then limited to a selectable range by a limiter 168. The result of the calculations $P_{sec}$ (TV) thus far is then used further by a subordinate pressure control circuit 70, 72, etc. The pressure control circuit ensures that the pressure $P_{sec}$ (MV) at the secondary pulley is set to the value $P_{sec}$ (DV).

SUMMARY OF THE INVENTION

It is an object of the invention to improve the customary belt-tension control on a continuously variable transmission known per se.

According to the invention, it is intended to replace the customary belt-tension control system by a slip control system. For this purpose, sensors are used to determine the slip and therefore the sliding of the belt and the actuating signal $P_p$ is set in such a way that the slip assumes an acceptable value which corresponds to a high efficiency of the transmission.

The invention thus proceeds from a transmission with a variable transmission ratio having a drive end and a driven end and means for establishing a mechanical operative connection, which can be influenced with respect to slip behavior, between the drive end and the driven end. A transmission of this kind can be seen, for example, in FIG. 1 which has already been described. According to the invention, the slip of the operative connection is adjusted to a specifiable desired value. For this purpose, corresponding control means are provided. By means of the control of the slip in accordance with the invention, it is thus possible, as already mentioned, to adjust the slip to an acceptable value which corresponds to a high degree of efficiency of the transmission. This results in the following advantages:

1. The slipping of the operative means, generally a force transmitting belt or a band or chain, is reliably prevented. In the known solutions, the pressure must be fixed at a level high enough to ensure that slipping is reliably prevented. Unevennesses in the road, braking operations, downshifts and brief increases in the torque to be transmitted due to dynamic load fluctuations can cause problems, however, making additional measures to avoid slipping necessary.
2. The transmission operates with a higher efficiency.
3. The mean pressure level and thus the hydraulic losses are reduced.
4. The requirements on the accuracy of the subordinate pressure control system are lower.

As already described with reference to the prior art, the transmission can be a belt transmission, and the drive end and/or the driven end can have at least one axially displaceable element, which essentially has the shape of a conical pulley disc. Furthermore, operative means in the form of at least one belt (preferably, a force transmitting belt, or a band or a chain) can be held between the pulley-half pair which defines the drive end and the pulley-half pair which defines the driven end. The slip between the operative means and the pairs of pulley halves holding the operative means is controllable.

It is particularly advantageous that the control system or control means are configured in such a way that, to control the slip, the actual slip is compared with a desired value which can be specified.

According to the invention, two variants are presented for slip control. Variant 1 requires an additional sensor while variant 2 includes a modification of the hitherto used rotational-speed sensor on the primary and/or secondary end.

For both variants, it is advantageous that first and second rotational-speed detection means are provided to detect the rotational speed of the conical pulleys of the drive end and/or driven end and that the output signals of these sensor means are supplied to the control means.

In variant 1, third speed detection means are advantageously provided to detect the speed of the operative means held between the pulley disc pairs. In particular, in this variant, the output signals of the first, second and third detection means are evaluated to determine the actual slip.

The basic idea of the second variant is that the rotational-speed sensor can simultaneously be used to measure the axial offset of the movable conical pulley discs and that it is possible to deduce the normal transmission ratio of the continuously variable transmission at zero slip from the axial offset.

With respect to variant 2, it is thus advantageous to provide at least one of the axially displaceable elements for detecting the axial displacement. In particular, in this variant the detection means is configured such that the output signal of a single sensor is evaluated both for rotational-speed detection and displacement detection.

The axial displacement and the rotational speed of the axially movable pulley disc are measured by means of the sensor arranged spatially fixed relative to this pulley disc. It is particularly advantageous that the axially movable pulley disc has an area which can be sensed by the sensor and which extends on the periphery of the pulley disc. This area has a structure which can be sensed by the sensor and which is such that an axial displacement of the pulley disc is represented by a significant change in the sensor signal.

For measurement of the rotation and axial displacement of the axially movable pulley disc, provision can be made for the area that can be sensed by the sensor and extends on the periphery of the pulley to have a significant surface structure in the form of a triangular, sawtooth or similar pattern.

The advantage of variant 2 is that no additional sensor is required for the slip control in accordance with the invention.

Advantageously, slip control according to the invention is activated only above a minimum rotational speed, preferably the primary rotational speed.

BRIEF DESCRIPTION OF THE DRAWINGS

The drawings herein consist of FIGS. 1 to 8 of which FIGS. 1 and 2 are considered above where the background of the invention is discussed. The invention will now be described with reference to FIGS. 3 to 8 wherein:

FIGS. 6 to 8 show an embodiment of the slip controller in accordance with variant 2. For this purpose.

DESCRIPTION OF THE PREFERRED EMBODIMENTS OF THE INVENTION

Figure 3:
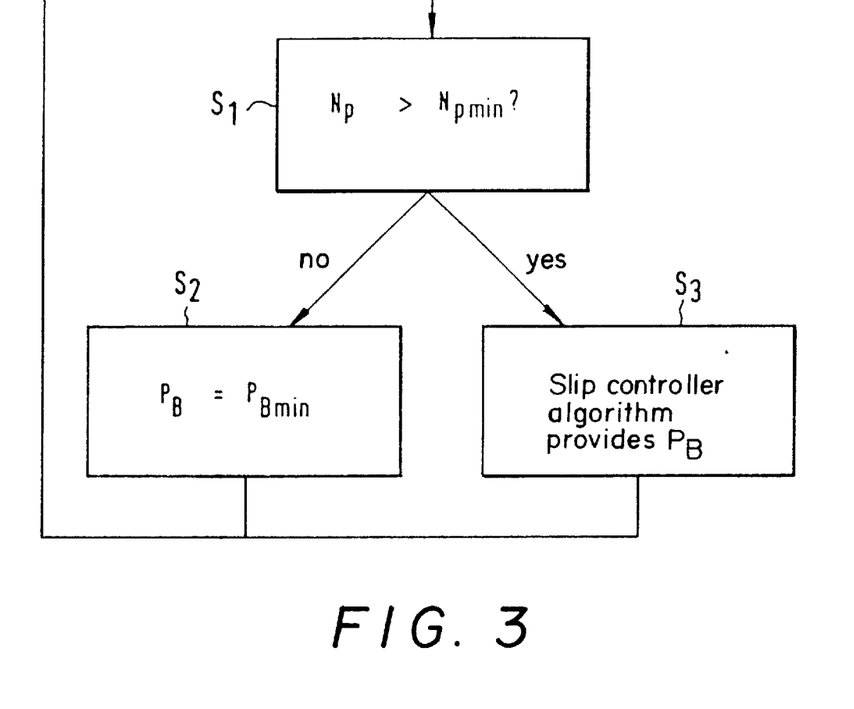
FIG. 3 shows a flowchart of the slip controller in accordance with variants 1 and 2.
Figure 5:
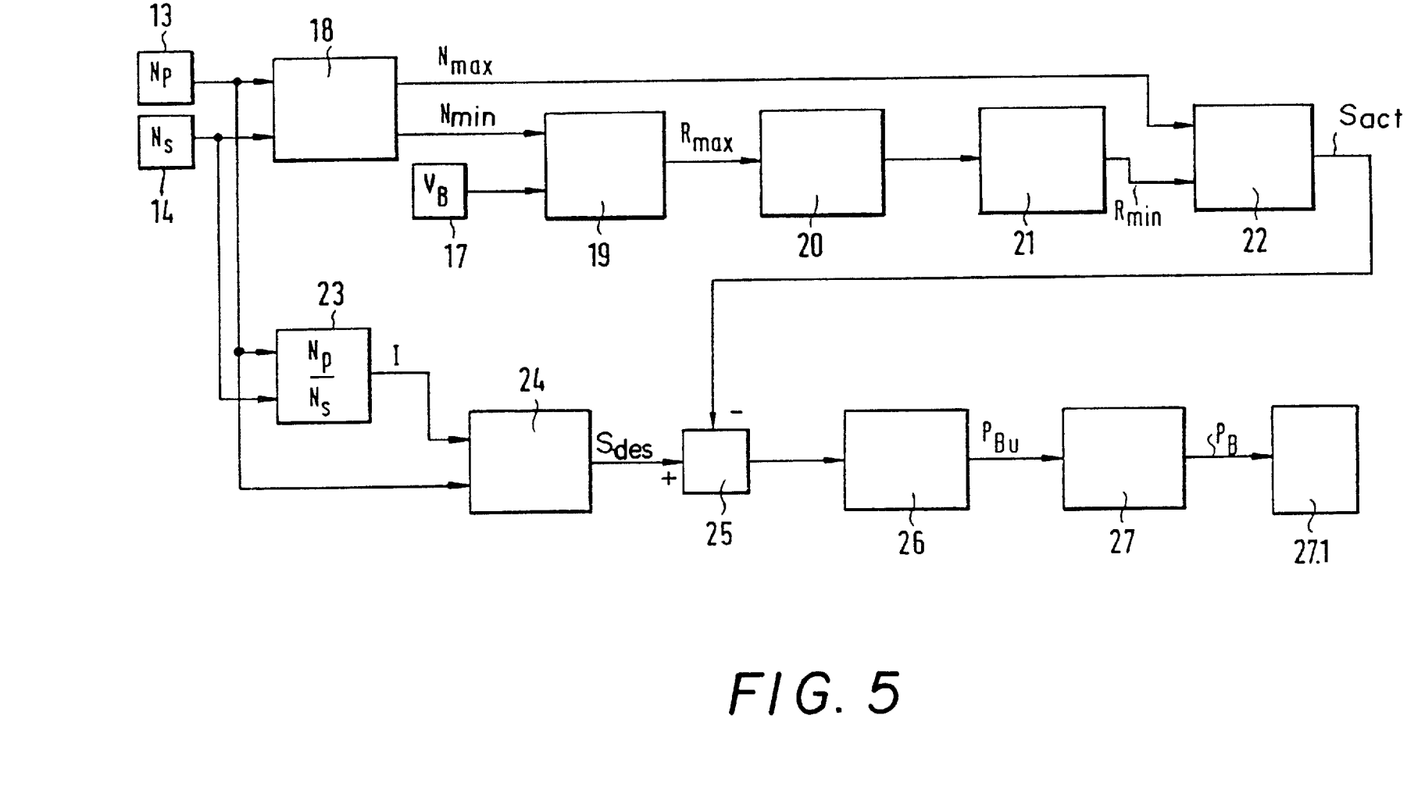
FIG. 5 is a block diagram of the slip controller of variant 1.
Figure 8:
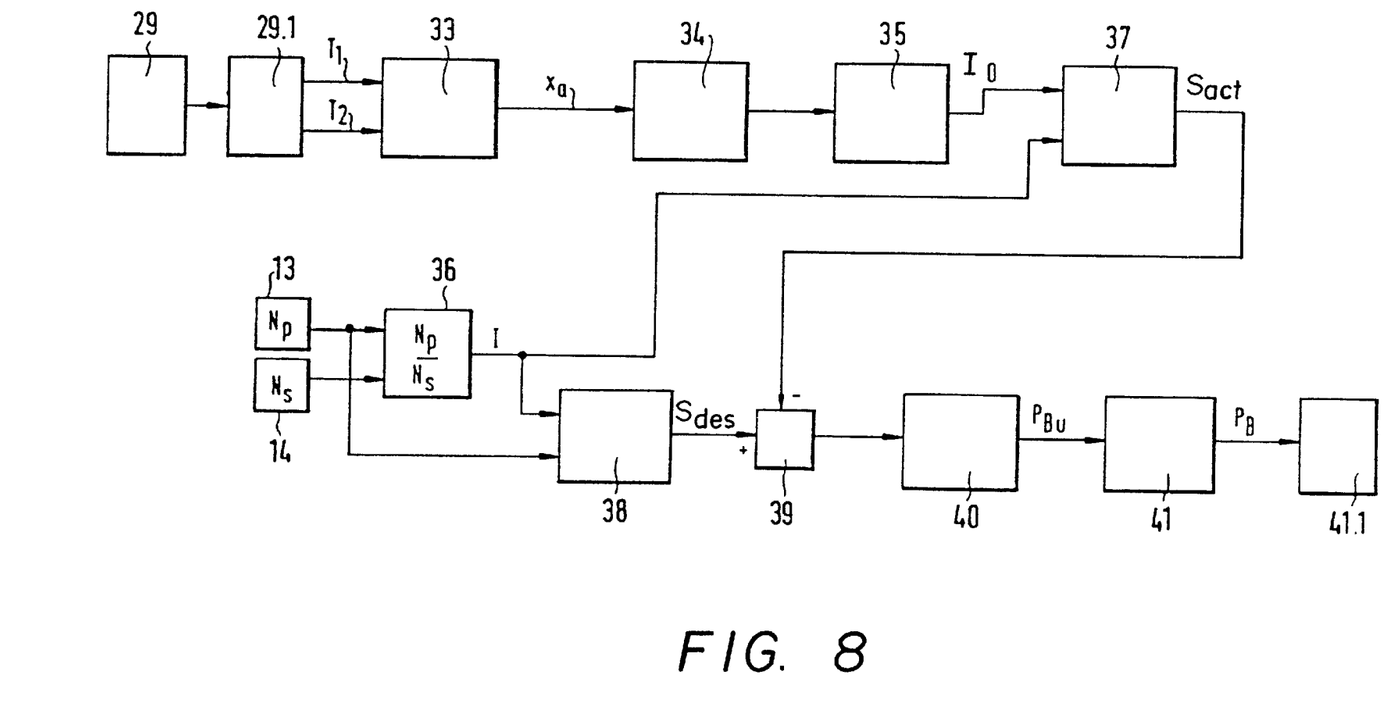
FIG. 8 comprises the block diagram of the slip controller in accordance with variant 2.

The control algorithm shown in FIG. 3 of the slip controller checks continuously whether the absolute value of the primary rotational speed $N_p$ is greater than a minimum primary rotational speed $N_{pmin}$ (constant) (Step S1). If this is not the case, then, in step S2, the actuating signal $P_B$ (equals the secondary pressure $P_s$ in the master-slave principle) is set to a fixed value $P_{Bmin}$ (constant). Otherwise, the algorithm of the slip controller of FIGS. 5 or 8 is executed and the actuating signal is set to the value determined there. The further processing of the actuating signal is performed by a subordinate pressure control system such as that described, for example, in the above-mentioned EP-A1-0,451,887.

Figure 4:
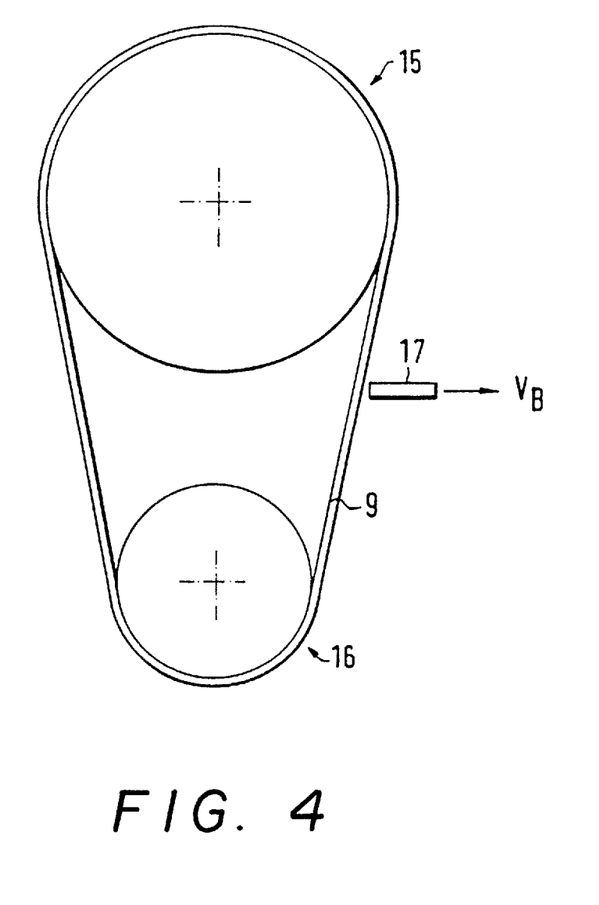
FIG. 4 shows the arrangement of the belt speed sensor for the slip controller according to variant 1.

FIG. 4 shows the arrangement according to the invention in accordance with variant 1. An inductive or Hall-type speed sensor 17 is arranged between the primary pulley disc 15 and the secondary pulley disc 16 and the speed $V_B$ of the force transmitting belt 9 is measured by this sensor 17. The selection of a suitable mounting location ensures that the distance between the sensor and the belt is so small that a sufficiently good sensor signal is available at all selectable transmission ratios of the transmission.

In block 18 of FIG. 5, the highest rotational speed $N_{max}$ in terms of its absolute value and the lowest rotational speed $N_{min}$ in terms of its absolute value are determined from the two signals representing the primary rotational speed $N_p$ and the secondary rotational speed $N_s$. The lowest rotational speed $N_{min}$ in terms of its absolute value and the belt speed $V_B$ are used in block 19 to calculate the radius $R_{max}$:

$$R_{max}=|V_B/N_{min}|*(30/2\,\pi)$$

This signal is smoothed by means of a low-pass filter 20. The radius $R_{min}$ is then calculated by means of the characteristic-field block 21. Using the equation $$S_{act}=1-|N_{max}*(R_{min}/V_B)|*(\pi/30),$$

the actual slip $S_{act}$ is calculated in block 22. Block 23 is used to calculate the transmission ratio I:

$$I=N_p/N_s.$$

The primary rotational speed $N_p$ and the transmission ratio I are used in block 24 to determine the desired slip from a characteristic field. The summing point 25 forms the difference between the desired slip and the actual slip. The PID controller 26 generates the actuating signal $P_{Bu}$. This signal is limited to minimum and maximum values by the limiter 27. The signal obtained is the actuating signal $P_B$, which is fed to the subordinate pressure regulator 27.1 (see FIG. 2).

Figure 6:
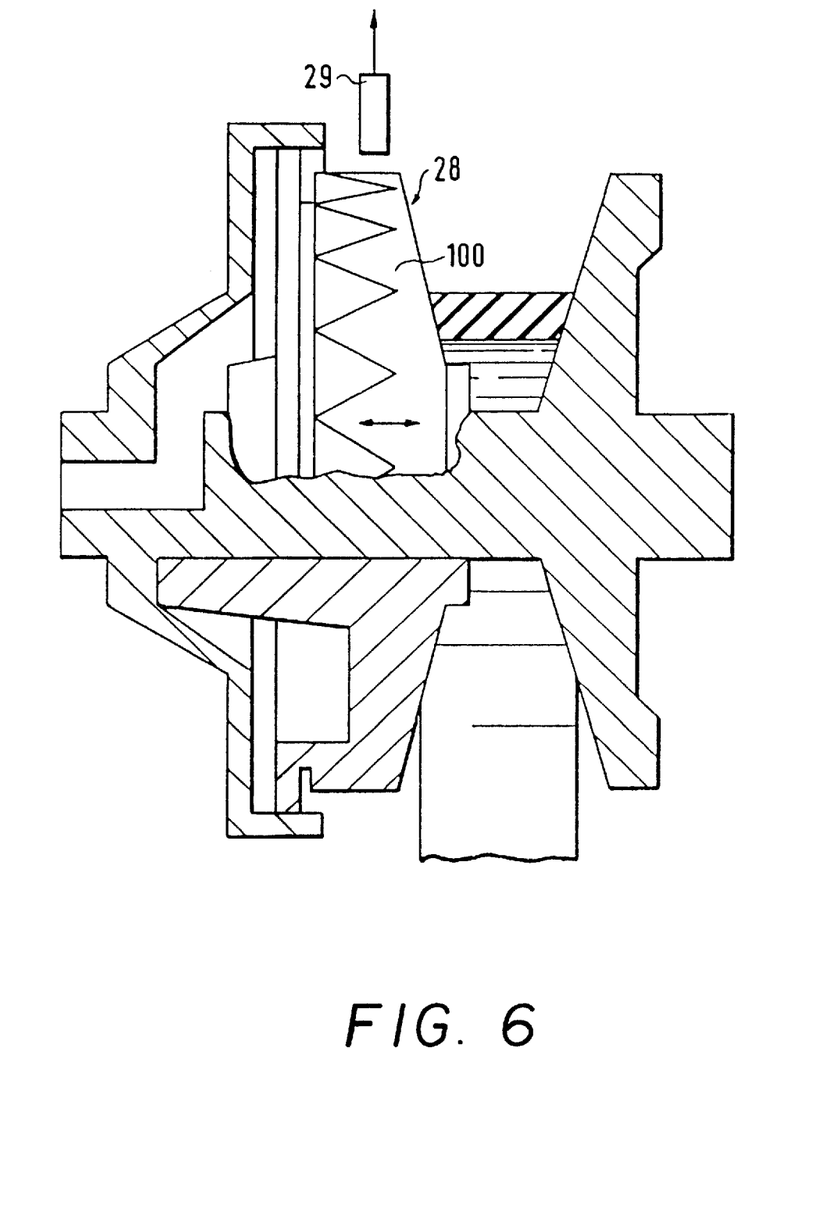
FIG. 6 illustrates the special embodiment of the rotational-speed sensors of variant 2 and FIG. 7 shows a pulse diagram of the combined rotational-speed and transmission-ratio sensor.

FIG. 6 shows variant 2 of the slip controller. To measure the primary and/or secondary rotational speeds, this variant uses one or more modified rotational-speed sensors, which are simultaneously used as transmission-ratio sensors. One possible constructional embodiment is shown in FIG. 6 using the primary pulley disc as an example.

The axially movable pulley disc 28 is modified in such a way on the outer periphery, by milling for example, that a triangular, sawtooth or similar pattern 100 is produced.

When the pulley disc is rotated, this pattern generates a signal in the inductive sensor 29 in such a way that it is possible to read both rotational-speed data and data on the axial position of the movable pulley disc from this signal. The pattern 100, which can be sensed by the sensor 29, can also be achieved by different material properties in this area which can be sensed by the sensor 29. Reference can be made, in this context, to different magnetic properties, for example.

Figure 7:
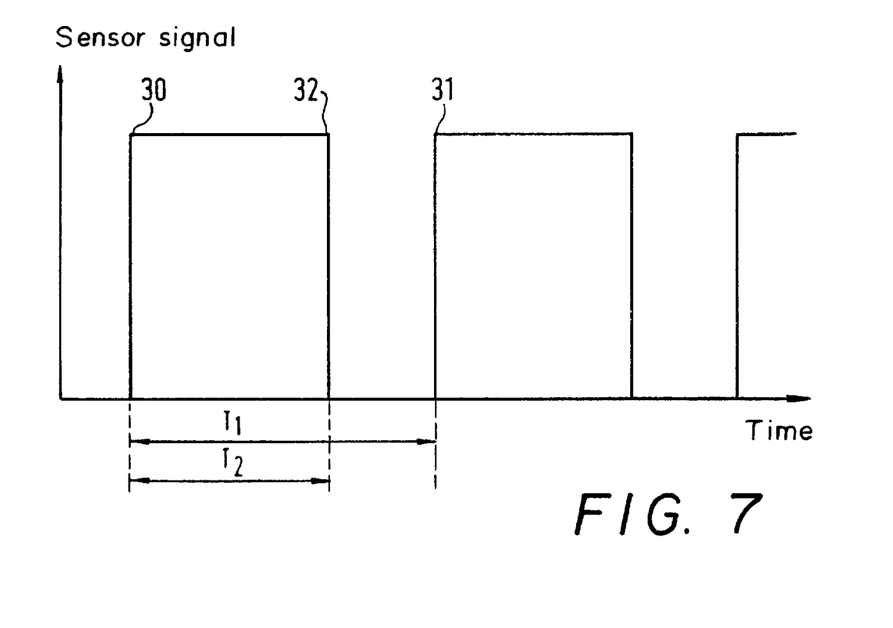

FIG. 7 shows a pulse diagram such as that which can be generated, for example, by the inductive sensor 29 of FIG. 6 when the pulley is rotated. The time interval $T_1$ between the two flanks 30 and 31 can be converted into a rotational-speed signal $N_p$ or $N_s$ (this conversion being sufficiently well known from the literature). If the interval $T_2$ between flanks 30 and 32 is compared to the interval $T_1$ between flanks 30 and 31, it is possible to calculate therefrom the axial offset of the movable conical pulley disc 28.

In FIG. 8, it can be seen that the output signal of the sensor 29 is evaluated in block 29.1, as described with reference to FIG. 7. Block 33 is used to calculate the axial offset $X_a$ of the conical pulley disc from the signals $T_1$ and $T_2$ (as described with reference to FIG. 7) and is smoothed by the low-pass filter 34. From the output of the latter, the characteristic-field block 35 determines the transmission ratio $I_0$. This is the transmission ratio that the transmission would have if the slip were zero. Block 36 determines the transmission ratio I from the primary rotational speed $N_p$ and the secondary rotational speed $N_s$. Block 37 calculates the actual slip $S_{act}$ in accordance with the equation:

$$S_{act} = 1 - (I_0/I)$$

The desired slip is fixed in block 38 as a function of the transmission ratio I and the primary rotational speed $N_p$ by means of a characteristic field. The summing point 39 forms the difference between the desired slip and the actual slip. This difference is converted by a PID controller 40 into an actuating signal $P_{Bu}$. The subsequent limitation to minimum and maximum values by block 41 supplies the signal $P_B$, which, as described with reference to FIG. 2, is fed to the subordinate pressure regulator 41.1.

In summary, the following may be stated with respect to the invention: For an electrohydraulically actuable continuously variable belt transmission, the selected contact pressure at the movable conical pulley discs must be of such a magnitude that the chain, the force transmitting belt or the like does not slip. On the other hand, the contact pressure must not be too great for a high efficiency of the transmission to be achieved at every operating point. The invention reliably prevents slippage of the belt (chain, force transmitting belt or the like) by controlling the belt slip. The mean contact pressure is thereby reduced. As a result, there is a decrease in the mechanical and hydraulic losses at the transmission. One variant of the invention includes an embodiment of a rotational-speed sensor by means of which simultaneously the axial position of the pulley disc(s) can be measured. As a result, there is a reduction in the additional complexity required for slip control compared to belt-tension control.

We claim:

1. An arrangement for controlling a continuously variable transmission having a drive end and a driven end, the arrangement comprising:

a continuous band for providing a mechanical operative connection between said drive and driven ends and an operative means defining an actual slip ($S_{act}$) between said ends;

adjusting means for acting on said continuous band to adjust said actual slip ($S_{act}$) of said continuous band relative to said drive and driven ends;

control means for controlling said adjusting means to adjust said actual slip ($S_{act}$) to a pregiven desired slip ($S_{des}$) of said continuous band;

said control means including first means for providing said pregiven desired slip ($S_{des}$);

said control means further including second means for determining said actual slip ($S_{act}$);

said control means further including a comparator for comparing said desired slip ($S_{des}$) to said actual slip ($S_{act}$) to provide a comparator output for controlling said actual slip ($S_{act}$) to said desired slip ($S_{des}$);

said ends being respective pulleys and each one of said pulleys being defined by a pair of conical pulley discs; one of said conical pulley discs of each pair being axially displaceable relative to the other conical pulley disc of the same pair; said continuous band being a belt or chain connected between and mounted on said pulleys; and, said adjusting means acting on the axially displaceable pulley discs to adjust said actual slip ($S_{act}$) between said continuous band and said pulleys.

2. The arrangement of claim 1, said continuously variable transmission being a belt transmission wherein said continuous band is belt connected between said ends; at least one of said ends having an axially displaceable element in contact engagement with said belt; and, said element being a conical pulley disc.

3. The arrangement of claim 2, said control means including a displacement detector for detecting the axial displacement of said axially displaceable element.

4. The arrangement of claim 1, said control means further including means for controlling said actual slip ($S_{act}$) via said displaceable pulley discs in dependence upon said comparator output.

5. The arrangement of claim 4, said control means including: a first rpm detector for detecting the rpm of one of the pulley discs of a first one of said pulleys; and, a second rpm detector for detecting the rpm of one of the pulley discs of the second one of said pulleys.

6. The arrangement of claim 5, said control means including a velocity detector for detecting the velocity ($V_B$) of said operative means.

7. The arrangement of claim 6, said first rpm detector, said second rpm detector and said velocity detector all having output signals supplied to said second means for evaluation to determine said actual slip ($S_{act}$).

8. The arrangement of claim 5, one of said rpm detectors being positioned to detect the rpm of the one conical pulley disc of one of said pulleys which is axially displaceable; and, said one rpm detector being configured to provide an output signal indicative of the rpm and of the axial displacement of said one conical pulley disc corresponding to said one detector.

9. The arrangement of claim 8, said one rpm detector being fixedly positioned relative to said one pulley disc which is axially displaceable; said one pulley disc having a peripheral surface region which passes said one rpm detector as said one pulley disc rotates so as to permit scanning of said surface region by said one rpm detector; and, structure means formed on said surface region for causing a significant change in the signal of said one rpm sensor when said one pulley disc displaces axially.

10. The arrangement of claim 9, said structure means being formed as a pattern of triangles or saw teeth.

11. The arrangement of claim 5, said adjusting means being controlled by said control means to control said actual slip ($S_{act}$) only after the rpm of one of said pulley discs exceeds a predetermined minimum rpm.

12. The arrangement of claim 11, wherein said one pulley disc is the pulley of said drive end.

13. A method for controlling a continuously variable transmission having a drive end and a driven end and having operative means for providing a mechanical operative connection between said drive and driven ends and said operative means defining an actual slip ($S_{act}$) between said ends, said ends having respective rotational axes and at least one of said ends including a rotating element displaceable along the rotational axis corresponding thereto, the method comprising the steps of:

equipping said transmission with adjusting means for mechanically acting on said operative means to adjust said actual slip ($S_{act}$) of said operative means relative to said drive and driven ends;

providing detecting means for detecting the axial displacement of said element;

configuring said detecting means as a single sensor adapted to also detect the rotation of said element and to output an output signal indicative of said rotation and said axial displacement;

providing control means which includes means for providing a pregiven desired slip ($S_{des}$); and, evaluating said output signal and controlling said actual slip ($S_{act}$) to said pregiven desired slip ($S_{des}$) in dependence upon said axial displacement and said rotation detected by said single sensor by acting on said adjusting means.

14. A method for controlling a continuously variable transmission having a drive end and a driven end and having a continuous band for providing a mechanical operative connection between said drive and driven ends and said continuous band defining an actual slip ($S_{act}$) between said ends, the method comprising the steps of:

configuring said ends to be respective pulleys and each one of said pulleys being defined by a pair of conical pulley discs;

configuring one of said conical pulley discs of each pair to be axially displaceable relative to the other conical pulley disc of the same pair;

providing said continuous band as a belt or chain connected between and mounted on said pulleys;

equipping said transmission with adjusting means for acting on the axially displaceable pulley disc to adjust said actual slip ($S_{act}$) between said continuous band and said pulleys;

providing control means including first means for providing a pregiven desired slip ($S_{des}$);

adapting said control means to include second means for determining said actual slip ($S_{act}$);

adapting said control means to include a comparator for comparing said desired slip ($S_{des}$) to said actual slip ($S_{act}$) to obtain a comparator output; and, controlling said actual slip ($S_{act}$) to said pregiven desired slip ($S_{des}$) in dependence upon said comparator output.

15. The method of claim 14, wherein said actual slip ($S_{act}$) is controlled only after one of said ends exceeds a minimum rpm.

16. The method of claim 14, wherein said actual slip ($S_{act}$) is controlled only after said drive end exceeds a minimum rpm ($N_{pmin}$).

17. An arrangement for controlling a continuously variable transmission having a drive end and a driven end, the arrangement comprising:

operative means for providing a mechanical operative connection between said drive and driven ends and said operative means defining an actual slip ($S_{act}$) between said ends;

said ends having respective rotational axes and at least one of said ends including a rotating element displaceable along the rotational axis corresponding thereto;

adjusting means for mechanically acting on said operative means to adjust said actual slip ($S_{act}$) of said operative means relative to said drive and driven ends;

detecting means for detecting the axial displacement of said element;

said detecting means being configured as a single sensor adapted to also detect the rotation of said element and to output an output signal indicative of said rotation and said axial displacement;

control means including means for providing a pregiven desired slip ($S_{des}$); and, said control means further including means for evaluating said output signal and controlling said actual slip ($S_{act}$) to said pregiven desired slip ($S_{des}$) in dependence upon said axial displacement and said rotation detected by said single sensor by acting on said adjusting means.

18. The arrangement of claim 17, said ends being respective pulleys and each one of said pulleys being defined by a pair of conical pulley discs; at least one of said conical pulley discs of one of said pairs being axially displaceable relative to the other conical pulley disc of the same pair; said operative means being a band, belt or chain connected between and mounted on said pulleys; and, said arrangement further comprising: adjusting means for acting on said operative means to adjust said actual slip ($S_{act}$) of said operative means relative to said drive and driven ends; and, said control means operating on said adjusting means to control said actual slip ($S_{act}$) to said pregiven desired slip ($S_{des}$).

19. The arrangement of claim 18, said control means further including a comparator for comparing said desired slip ($S_{des}$) to said actual slip ($S_{act}$) to provide a comparator output for controlling said actual slip ($S_{act}$) to said desired slip ($S_{des}$).

20. The arrangement of claim 19, further comprising: a first rpm detector for detecting the rpm of one of the pulley discs of a first one of said pulleys and providing a first rpm signal ($N_p$); a second rpm detector for detecting the rpm of one of the pulley discs of the second one of said pulleys and providing a second rpm signal ($N_s$); and, said first and second rpm signals being supplied to said control means.

21. The arrangement of claim 20, said control means including a velocity detector for detecting the velocity ($V_B$) of said operative means.

22. The arrangement of claim 21, said first rpm detector, said second rpm detector and said velocity detector all having output signals supplied to said control means for evaluation to determine said actual slip ($S_{act}$).

23. The arrangement of claim 18, said single sensor being fixedly positioned relative to said one pulley disc which is axially displaceable; said one pulley disc having a peripheral surface region which passes said one rpm detector as said one pulley disc rotates so as to permit scanning of said surface region by said one rpm detector; and, structure means formed on said surface region for causing a significant change in the signal of said one rpm sensor when said one pulley disc displaces axially.

24. The arrangement of claim 23, said structure means being formed as a pattern of triangles or saw teeth.

25. The arrangement of claim 17, said control means being so configured that said actual slip ($S_{act}$) is controlled only after the rpm of one of said pulley discs exceeds a predetermined minimum rpm ($N_{pmin}$).

26. The arrangement of claim 25, wherein said one pulley disc is the pulley of said drive end.

27. An arrangement for controlling a continuously variable transmission having a drive end and a driven end, the arrangement comprising:

operative means for providing a mechanical operative connection between said drive and driven ends and said operative means defining an actual slip ($S_{act}$) between said ends;

said ends having respective rotational axes and at least one of said ends including a rotating element displaceable along the rotational axis corresponding thereto;

adjusting means for mechanically acting on said operative means to adjust said actual slip ($S_{act}$) of said operative means relative to said drive and driven ends;

said ends being respective pulleys and each one of said pulleys being defined by a pair of conical pulley discs;

one of said conical pulley discs of each pair being axially displaceable relative to the other conical pulley disc of the same pair;

said operative means being a band, belt or chain connected between and mounted on said pulleys;

said adjusting means being adapted to act on the displaceable pulley discs to adjust said actual slip ($S_{act}$) between said operative means and said pulleys;

a first rpm detector for detecting the rpm of one of the pulley discs of a first one of said pulleys;

a second rpm detector for detecting the rpm of one of the pulley discs of the second one of said pulleys;

velocity detector for detecting the velocity ($V_B$) of said operative means; and, control means for operating on said adjusting means to control said actual slip ($S_{act}$) to a desired slip ($S_{des}$) in dependence upon the detected rpms of said one pulley discs, respectively, and in dependence upon said velocity ($V_B$) of said operative means.

28. The arrangement of claim 27, said operative means being a band, belt or chain connected between and mounted on said pulleys.

29. The arrangement of claim 28, said control means further including a comparator for comparing said desired slip ($S_{des}$) to said actual slip ($S_{act}$) to provide a comparator output for controlling said actual slip ($S_{act}$) to said desired slip ($S_{des}$).

30. The arrangement of claim 27, said control means being so configured that said actual slip ($S_{act}$) is controlled only after the rpm of one of said pulley discs exceeds a predetermined minimum rpm ($N_{pmin}$).

31. The arrangement of claim 30, wherein said one pulley disc is the pulley of said drive end.

* * * * *